No. 661,210. Patented Nov. 6, 1900.
J. W. EISENHUTH.
RUNNING GEAR FOR MOTOR VEHICLES.
(Application filed Jan. 23, 1900.)
(No Model.) 2 Sheets—Sheet 1.

No. 661,210. Patented Nov. 6, 1900.
J. W. EISENHUTH.
RUNNING GEAR FOR MOTOR VEHICLES.
(Application filed Jan. 23, 1900.)

(No Model.) 2 Sheets—Sheet 2.

Witnesses Inventor
Esther V. Byng. John W. Eisenhuth
Hugh P. Groves. his Attorneys

THE NORRIS PETERS CO., PHOTO-LITHO., WASHINGTON, D. C.

UNITED STATES PATENT OFFICE.

JOHN W. EISENHUTH, OF NEW YORK, N. Y., ASSIGNOR, BY MESNE ASSIGNMENTS, TO MAMIE G. READ, OF SAME PLACE.

RUNNING-GEAR FOR MOTOR-VEHICLES.

SPECIFICATION forming part of Letters Patent No. 661,210, dated November 6, 1900.

Application filed January 23, 1900. Serial No. 2,485. (No model.)

*To all whom it may concern:*

Be it known that I, JOHN W. EISENHUTH, a citizen of the United States, residing at New York city, in the county of New York and State of New York, have invented certain new and useful Improvements in Running-Gear for Motor-Vehicles; and I do hereby declare the following to be a full, clear, and exact description of the invention, such as will enable others skilled in the art to which it appertains to make and use the same.

My invention relates to improvements in running-gear for motor-vehicles; and it consists in a running-gear comprising a frame joining front and rear wheels, a power-shaft connected with the rear wheels, means for imparting motion to the same, means for turning the front wheels to guide the vehicle, shafting connected with the guiding-wheels, means imposed in the said shafting for accommodating the same to the different positions of the guiding-wheels, and means connecting the said shafting with the rear power-shaft, so that motion may be imparted to either front or rear wheels, as may be desired.

It also consists in a running-gear comprising a suitable frame, guiding-wheels pivotally mounted thereon, racks upon the said wheels, pinions engaging the said racks, and a power-pinion for moving the same for changing the position of the wheels for guiding the vehicle, means for turning the said power-pinion, and means for connecting power with the wheels of the running-gear for propelling the same.

It further consists in a running-gear comprising a suitable frame and a power-shaft mounted thereon connected with a suitable motive power, shafting connected with the front guiding-wheels, the said shafting being made up of sections connected together by means of universal joints, some of said sections being formed of telescoping parts, whereby the shafting may accommodate itself to the different positions of the guiding-wheels and still be capable of actuating the same for propelling the vehicle.

It also consists in certain other novel constructions, combinations, and arrangements of parts, as will be hereinafter fully described and claimed.

Figure 1:
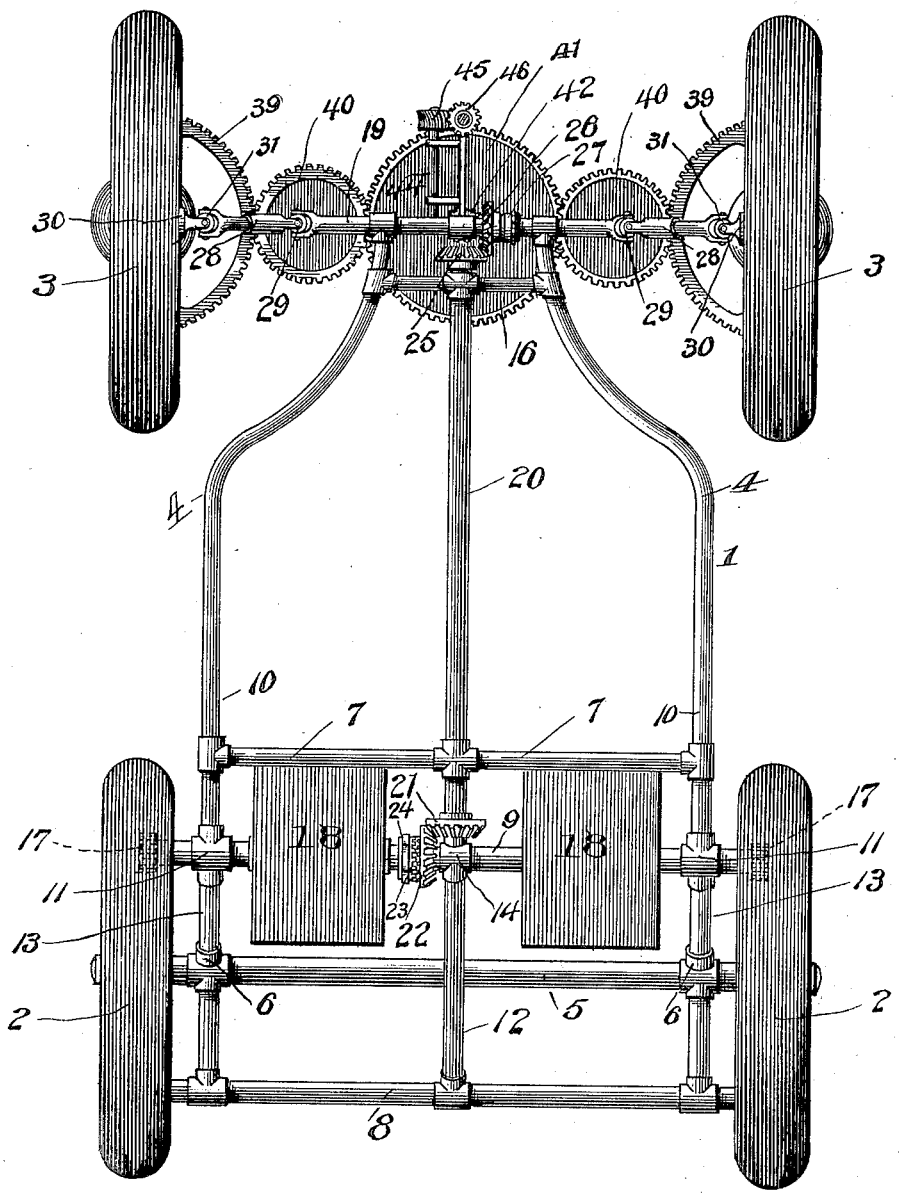
Figure 2:
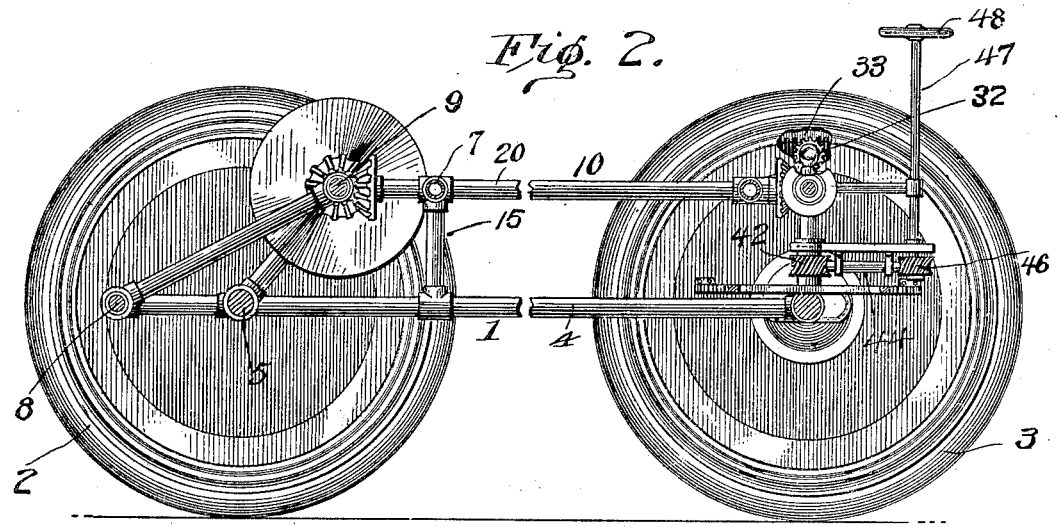
Figure 3:
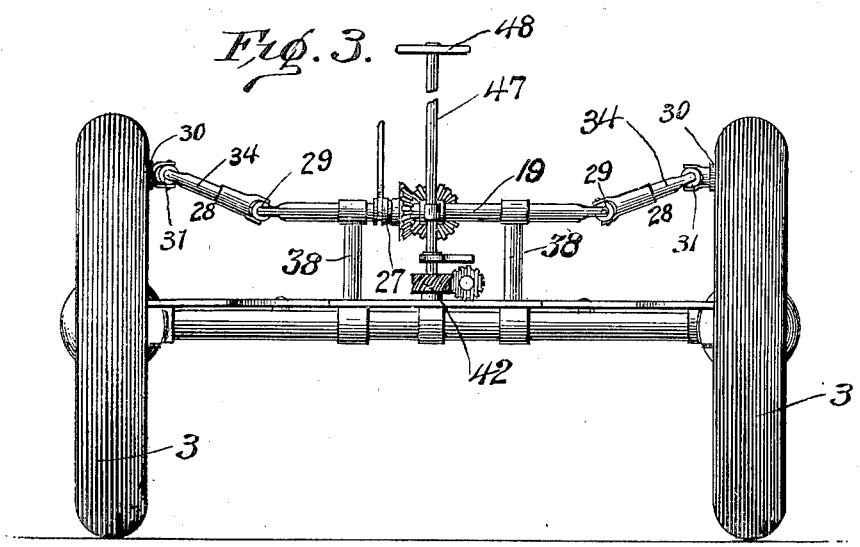
Figure 4:
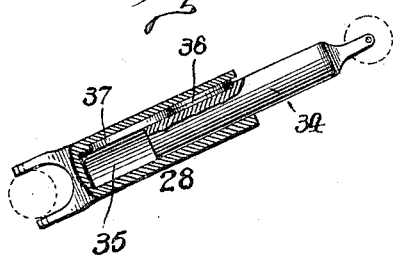

In the accompanying drawings, Figure 1 represents a top plan view of a running-gear constructed in accordance with my invention. Fig. 2 represents a longitudinal vertical section through said running-gear, parts being shown in side elevation. Fig. 3 represents a front end elevation of the said running-gear. Fig. 4 represents a detail view of one of the telescoping shaft-sections, a part of the same being in section and a part in side elevation.

1 in the drawings represents the frame of my improved running-gear, 2 2 the rear wheels, and 3 3 the forward guiding-wheels.

My invention is designed to supply a running-gear for motor-vehicles which will be thoroughly braced for supporting the machinery for the motive power and which will be capable of being easily guided from place to place under the control of the operator of the vehicle. The construction of the mechanism is such also that power can be imparted to either the rear wheels or the front wheels of the vehicle or to both at the same time and in such a manner as not to interfere with the steering of the said vehicle.

The framing 1 is preferably formed of tubing, so as to be possessed of great strength, the said framing 1 comprising side bars 4 4, which are mounted upon the axle 5 of the rear wheels 2 2, suitable bearings being formed upon the said framing to engage the said axle 5, as at 6 6. The forward ends of the side bars 4 4 are preferably drawn inwardly, so as to allow sufficient room for the movements of the guiding-wheels 3 3. The rear end of the side tubes 4 4 preferably extend beyond the axle 5 suitable distances and are connected at their rear ends by means of cross-tubing, as at 8. Just forward of the rear axle 5 and a little in front of the same is mounted a power-shaft 9, the said power-shaft having bearings in an upper frame portion 10 10. The bearings 11 11 thus supporting the said power-shaft 9 are braced in position by incline brace-rods 12 and 13, the brace-rods 13 connecting the same with the bearings 6, while the brace-rods 12 extend from a central bearing upon the said shaft, as 14, to the rear cross brace-rod 8. The upper brace-rods 10 10 are braced with respect to the other brace-rods 4 4 by means of the vertical bars, as 15. The front ends of the frame-tubes 4 4 carry an axle 16, being readily secured thereto. The axle projects upon either side of the framing and carries the guiding-frames 3 3. The rear ends of the upper framing 10 10 are braced by a cross brace-rod 7. The power-shaft 9 carries at each end a power-pinion, as at 17, which is adapted to engage the gearing upon the rear wheels 2 2 for propelling the same. Upon the said power-shaft is mounted a suitable actuating means—such, for instance, as 18 18—which may be of any desired construction.

I find it very desirable in motor-vehicles to be able to transmit power to the guiding-wheels as well as to the usual driving-wheels. For this purpose I mount a shaft 19 in the forward ends of the frame-tubes 10 10. This shaft 19 is connected with each of the drive-wheels 3 3, as will be hereinafter more fully described. A connecting-shaft, as 20, is mounted in suitable bearings upon the frame of the vehicle and extends from the front shaft 19 to the power-shaft 9. Upon the rear end of the shaft 20 is mounted a bevel-gear 21, which is adapted to mesh with a bevel-gear 22, loosely mounted upon a power-shaft 9. A clutch, as 23, is splined upon the shaft 9 and may be moved by a lever engaging an annular groove 24 upon the said clutch in the usual way. The clutch 24 may be thrown into engagement thus with a corresponding clutch formed upon a gear 22, so as to impart motion from the shaft 9 to the shaft 20. The shaft 20 carries at its forward end a bevel-gear 25 and is adapted to mesh with a corresponding gear 26, running loosely upon a shaft 19. A clutch, as 27, upon the said shaft 19 is used to connect the bevel-gear 26 with the said shaft when it is desired to impart motion thereto from the shaft 20. Inasmuch as the guiding-wheels 3 3 are pivotally mounted upon the axle 16, it is necessary to engage the shaft 19 with the said wheels in such a manner as to permit the free movements of the wheels in guiding the vehicle. For this purpose I interpose between the ends of the shaft 19 and the wheels 3 3 short telescoping shaft-sections 28 28, the inner ends of the said shaft-sections being connected with the ends of the shaft 19 by universal joints 29 29, while the outer ends of the sections 28 28 are connected with short shaft-sections 30 30 by means of universal joints 31 31. The short shafts 30 30 carry actuating-pinions 32, which mesh with internal gears 33, secured to the wheels 3 3. Thus motion may be imparted from the shaft 20 to each of the guiding-wheels 3 3. The telescoping sections 28 28 are preferably formed with shaft portion 34, adapted to extend into a socket portion 35. A groove is formed in the inner surface of the socket-section and is adapted to register with a groove formed in a shaft portion 34, so as to form a keyway, as at 36, to accommodate a key or spline, as 37. By this means the shaft-sections 28 28 can lengthen or shorten, according to the position of the guiding-wheels, and yet will transmit power to the same. The bearings in the upper frame 10 10 carrying the shaft 19 are preferably braced, with respect to the axle 16, by means of the vertical tubes or rods 38.

The steering of the wheels 3 3 also forms an important feature of the invention and will now be fully described. A yoke or segment, as 39, is secured to the inner surface of the wheels 3 3. These wheels are made with a stationary central web portion and a revoluble rim portion. While these wheels may be of any desired form of this general class, yet I preferably construct them in a similar manner to that described and shown by me in an application for patent applied for upon even date herewith. The segments or yokes 39 39 thus rigidly secured to the web portions of the wheels are capable of controlling the wheels perfectly and turning them on their pivot-points and directing the vehicle in its movements from place to place. Mounted upon shaft 16 and meshing with each of the racks 39 39 are intermediate pinions 40 40, which connect the racks with a centrally-arranged actuating-pinion 41, also mounted upon the shaft 16. Connected to the shaft of the said pinion 41 is a spiral gear-wheel 42, which meshes with a corresponding spiral gear carried by the inner end of a short shaft 44. To the outer end of the said short shaft 44 is also secured a spiral gear 45, which meshes with spiral gear 46, mounted upon the lower end of a vertical shaft 47. The shaft 47 extends upwardly from the steering mechanism and can be allowed to project through the floor of the vehicle to a point within easy reach of the operator of the vehicle. The shaft 47 is provided at its upper end with a hand operating means—such, for instance, as a hand-wheel 48. By turning the hand-wheel 48 motion is transmitted therefrom through the spiral gear and the short shaft 44 to the actuating gear-wheel 41. This gear-wheel in turn transmits motion through the intermediate gears 40 40 to each of the segments 39 39. It will be apparent that by this means the guiding-wheels 3 3 may be moved simultaneously in a proper direction to carry the vehicle one way or another, as may be desired. The use of spiral gears for communicating motion to these parts makes it possible to hold the parts rigidly in any adjusted position, and yet admits of a quick and easy manipulation of the wheels to properly guide the vehicle.

It will be apparent from the above description that by my invention a vehicle may be provided with power mechanism so connected with the rear wheels as to be capable of propelling the vehicle by means of the same and that when desired the forward guiding-wheels may also be connected with the said motive power to assist the rear wheels in propelling the vehicle. This not only adds greatly to the power with which the vehicle is driven because of the increased traction, but is very convenient where one or more of the wheels are engaged in a slippery place and cannot get good contact with the substance over which they are passing. It will also be apparent that I am enabled to connect the guiding-wheels with the motive power without interfering with the movements of the said wheels necessary to the guiding of the said vehicle. It will be further seen that the guiding-wheels are under the perfect control of the operator of the vehicle through the steering mechanism. It will be observed that the construction of the frame is such that the running-gear is strongly braced in all directions, and though the frame may be made comparatively light yet it will be very strong.

Having now described my invention, what I claim as new, and desire to secure by Letters Patent, is—

1. A running-gear for vehicles comprising a frame joining front and rear wheels, a power-shaft connected with the rear wheels, means for imparting motion to the same, means for turning the front wheels to guide the vehicle, and shafting connected with the revoluble rims of the guiding-wheels, and means imposed in the said shafting for accommodating the same to the different positions of the guiding-wheels and means connecting said shafting with the rear power-shaft so that motion may be imparted to either front or rear wheels, substantially as described.

2. A running-gear for vehicles comprising a suitable frame, guiding-wheels pivotally mounted thereon, segments upon the non-revoluble webs of the said wheels, pinions engaging the said racks and a power-pinion for moving the same for changing the position of the wheels for guiding the vehicle, means for turning the said power-pinion and means for connecting the power with the wheels of the running-gear for propelling the same substantially as described.

3. A running-gear for vehicles, comprising a suitable frame, a power-shaft mounted thereon and adapted to be connected with a suitable motive power, a rim driving mechanism for actuating the front steering-wheels comprising a jointed shaft made up of sections, universal joints connecting the said sections, some of the sections being formed with telescoping parts, whereby the shafting may accommodate itself to the different positions of the guiding-wheels and may be led to the rims of the said wheels for actuating the same, substantially as described.

4. In a running-gear for vehicles, the combination with a power-shaft having pinions for driving the rear wheels of a vehicle, means for actuating the said power-shaft, a longitudinal shaft carried by the said framing and having a gear meshing with a gear on the power-shaft, means for throwing said latter gear into and out of engagement with a gear on the transmitting-shaft, a shaft mounted upon the forward end of the said frame and connected by means of bevel-gears with the longitudinal transmitting-shaft, a clutch for bringing the bevel-gear into connection with the said forward shafts, short shafts connected with the revolving rims of the guiding-wheels of the vehicle so that it may actuate the same, telescopic shafts connecting the short shaft with the ends of the forward shaft and universal joints interposed between the parts of the shaft, the construction being such that power may be transmitted to one set of wheels or to both sets of wheels for the better propelling of the vehicle, this construction not interfering with the guiding of the vehicle, substantially as described.

5. A running-gear for vehicles comprising upper and lower frame portions, the lower frame portions resting upon the axles of the vehicle, rigid axles supporting the frame, guiding-wheels having non-revoluble web and revoluble rim portions, brace-rods for supporting the upper frame in position upon the lower frame, a power-shaft mounted upon the said upper frame, and inclined braces for bracing the power-shaft and the upper frame rigidly in position, substantially as described.

6. In a running-gear for vehicles the combination with a suitable frame of power mechanism mounted thereon, guide-wheels having non-revoluble web portions pivotally secured to said frame, segments secured to the web portions of the said guiding-wheels and projecting inwardly therefrom, and gearing for engaging the said segments to turn the wheels, substantially as described.

7. In a running-gear for vehicles the combination with a suitable frame on axles supporting the same, guiding-wheels secured to the end of one of said axles, the guiding-wheels being pivotally adjusted to the said axles so as to turn vertically with respect to the same, yokes or segments rigidly secured to the said guiding-wheels and projecting inwardly therefrom, intermediate gears meshing with the segments, said gears being pivotally mounted upon the said axle, an actuating gear-wheel also mounted upon said axle and engaging each of the intermediate gears, a hand operating means engaging with the said actuating-gear whereby the guiding-wheels may be turned simultaneously to guide the vehicle, substantially as described.

8. In a running-gear for vehicles the combination with a suitable frame, guiding-wheels connected therewith, segments secured to said guiding-wheels, intermediate pinions meshing with the said segments, an actuating-gear engaging the said intermediate gear, a spiral gear connecting the actuating gear-wheel with a short shaft, a spiral gear connecting the short shaft with a hand operating-shaft whereby the guiding-wheels may be turned simultaneously for guiding the gears of the vehicle, substantially as described.

In testimony whereof I hereunto affix my signature in presence of two witnesses.

JOHN W. EISENHUTH.

Witnesses:
FENTON S. BELT,
VAN BUREN LAMB.